United States Patent [19]
Mackay

[11] 4,059,770
[45] Nov. 22, 1977

[54] UNINTERRUPTIBLE ELECTRIC POWER SUPPLY

[75] Inventor: Robin Mackay, Palos Verdes Peninsula, Calif.

[73] Assignee: The Garrett Corporation, Los Angeles, Calif.

[21] Appl. No.: 514,728

[22] Filed: Oct. 15, 1974

[51] Int. Cl.² ............................................. H02K 7/18
[52] U.S. Cl. ....................................... 290/4 C; 322/9
[58] Field of Search ..................... 290/4 R, 30 R, 4 C; 322/9, 28

[56] References Cited

U.S. PATENT DOCUMENTS

| | | | |
|---|---|---|---|
| 2,329,675 | 9/1943 | Albers | 290/44 |
| 2,597,357 | 5/1952 | McCormick | 322/28 |
| 2,920,211 | 1/1960 | Gotoh | 290/4 R |
| 2,972,056 | 2/1961 | Park et al. | 322/9 |
| 3,141,096 | 7/1964 | Singelmann | 290/4 R |
| 3,142,793 | 7/1964 | Grillo | 322/9 |
| 3,187,188 | 6/1965 | Adkins et al. | 290/4 R |
| 3,196,341 | 7/1965 | Geib | 290/4 R |
| 3,296,451 | 1/1967 | Van Ausdal et al. | 290/4 R |
| 3,526,778 | 9/1970 | Crocker et al. | 290/30 R |

*Primary Examiner*—Robert K. Schaefer
*Assistant Examiner*—John W. Redman
*Attorney, Agent, or Firm*—Alfons Valukonis; Joel D. Talcott; Albert J. Miller

[57] ABSTRACT

An electric power supply system for a load wherein two prime movers, a gas turbine and a synchronous electric motor receiving its motive energy from a source of electric power, such as a public utility, are utilized to simultaneously drive an electric generator. A fuel controller, which is responsive to the output of the generator, operates in an isochronous mode and regulates the supply of fuel to the gas turbine from a fuel source to bring the turbine, generator, and motor up to operating speed. A paralleling controller, which is responsive to both the output of the generator and the output of the utility power source connects the motor to the utility when the outputs of the generator and utility are of equal frequency and phase so that the motor shares the load in driving the generator. A power sensor compares the flow of electric energy to the motor with a fixed reference signal, and generates a resultant difference signal which is used to trim the turbine fuel controller to speed up or slow down the turbine so that constant power flows through the power sensor and motor, resulting in the motor always providing a fixed or predetermined amount of driving force to the generator while the turbine provides the rest. Additionally provided is a reverse current sensor, which detects interruption of current flow from the utility, and immediately disconnects the motor from the utility. The fuel controller now operates in an isochronous mode without trimming signals from the power sensor, and the turbine is thus controlled to provide all the needed driving force to drive the generator to maintain constant generator frequency and phase output. An overrunning clutch is utilized between the turbine and generator which allows easy disconnection of the turbine from the generator in the event the turbine becomes disabled, while all the driving force needed by the generator is supplied by the synchronous motor. In the event the entire electric system is disabled, a switch connects the load directly to the utility source.

14 Claims, 1 Drawing Figure

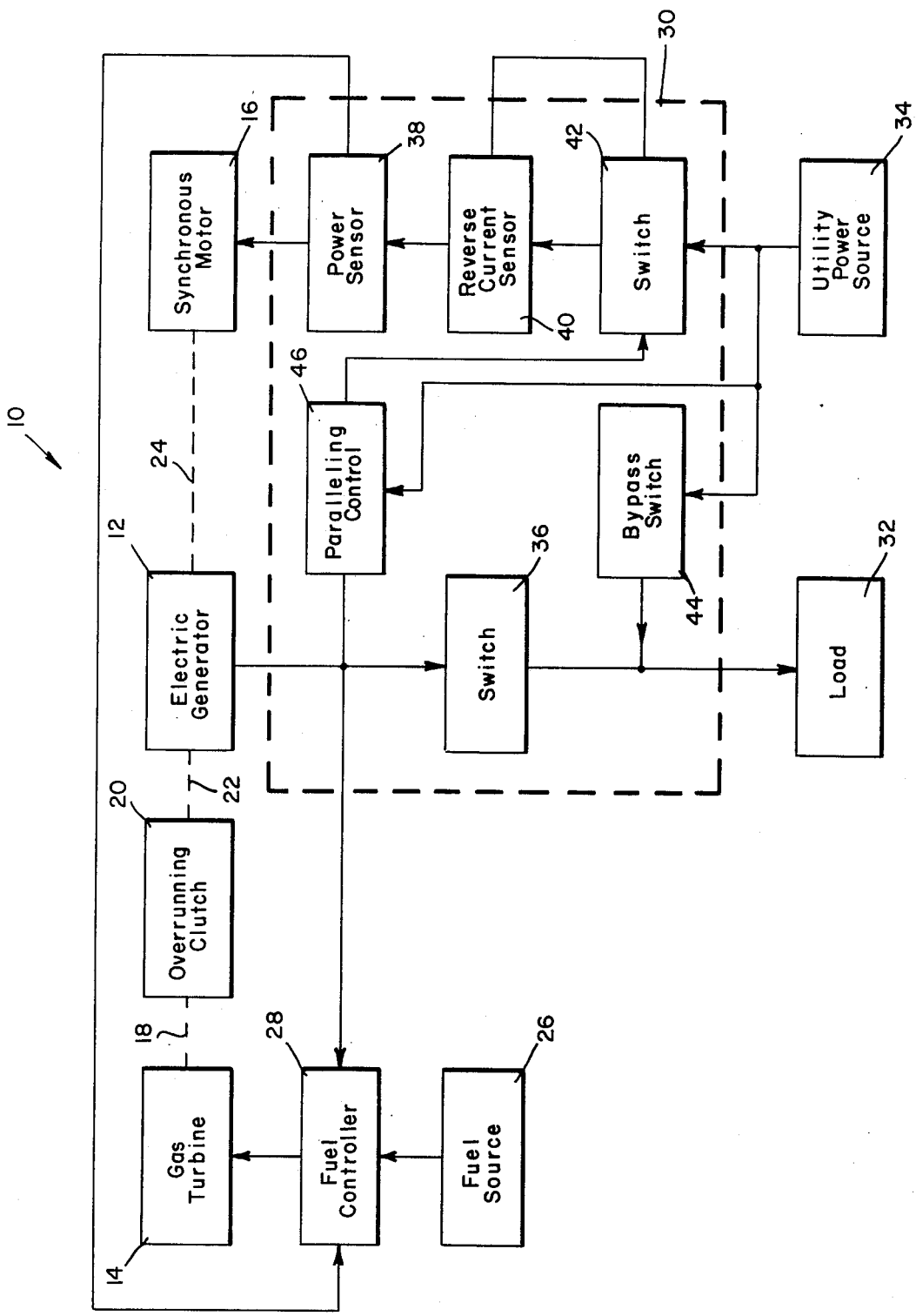

UNINTERRUPTIBLE ELECTRIC POWER SUPPLY

BACKGROUND OF THE INVENTION

This invention relates generally to an electric power supply system, and in particular to an uninterruptible electric power system.

In prior electric power supply arrangements, complex differentials, gear trains or belts were used as drives between the prime movers and the generator, with great sacrifice of simplicity. Other power arrangements failed to provide precise frequency and phase control of the generator power output. Still other arrangements presented dynamic control problems resulting from lack of close coupling between the prime movers and the electric generator. Still other power arrangements failed to provide precise load sharing control between the prime movers or permit load transfer without interruption.

Examples of prior art electric power systems can be found in U.S. Pat. No. 3,283,165 to Black, and U.S. Pat. No. 3,345,517 to Smith.

SUMMARY OF THE INVENTION

In accordance with the present invention, electric power supply system apparatus is provided which eliminates the above-mentioned disadvantages of prior art electric systems.

In the preferred embodiment of this invention there is provided electric power supply system apparatus with an electric generator, first and second mover means to drive the generator, and means for proportioning motive energy to the first and second mover means to provide constant driving force to the generator to maintain the generator output frequency constant and in phase with the output of a source of electric energy.

It will be seen that the power supply system of this invention is simple, uninterruptible, frequency and phase output controlled, and has load sharing prime movers.

DETAILED DESCRIPTION OF THE PREFERRED EMBODIMENT

Referring to the drawing, which is a sole FIGURE, block diagram illustration of the power supply system 10 of the present invention, electric generator 12 can be a conventional alternating current generator, producing, for example, 120/208 volts at 60 Hz, when rotating at 1800 RPM. A first mover in the form of a turbine 14, and a second mover in the form of a synchronous motor 16 are each connected in line to generator 12 by a driving means so that both or one of them is always driving generator 12. A first driving means interconnecting turbine 14 and generator 12 includes a shaft 18, overrunning clutch 20 (or fluid coupling), and shaft 22. A second driving means, in the form of shaft 24 mechanically interconnects generator 12 and motor 16 in such a way that the electric output of generator 12 is in phase with the electric input to synchronous motor 16. Turbine 14 receives its fuel from a source 26 through a fuel controller 28. Both turbine 14 and motor 16 should be so sized that either alone could drive generator 12 at its full rated output. A control system 30 interconnects generator 12, motor 16 and fuel controller 28 to a load 32 and a power source 34, which could be an electric utility, or the like.

It will be appreciated that turbine 14 could be any of a wide variety of prime movers including diesel engines, gasoline engines, steam engines, or the like.

Synchronous motor 16 can be of the self-starting type, if it is desired that the system 10 be used as a simple motor and generator set, either for reasons of economy, or if turbine 14 becomes inoperable. Motor 16 could also be of the non-self-starting type if turbine 14 is to be utilized as the starting device.

Fuel controller 28 is conventional, and can be of the type providing isochronous speed control for turbine 14. Such isochronous fuel controllers are well known, and widely used on turbines driving generators for providing constant turbine speed, regardless of the generator load, through the use of built-in electronic speed control circuits which monitor the generator output for changes in load and speed which are compared to a reference signal. For example, if a differential in load 32 and speed of generator 12 with respect to the generated reference signal were to arise, the fuel controller 28 would immediately act to regulate flow of fuel from fuel source 26 to turbine 14 to regulate the speed of turbine 14 to the correct governed value. A controller such as the EG-3 governor, revealed and described in Bulletin 37701B, distributed by the Woodward Governor Company, Rockford, Ill., can be utilized as the controller 28 of the present invention.

Control system 30 includes a manually operated switch 36 interconnecting the output of generator 12 to the load 32. A power sensor 38, reverse current sensor 40, and switch 42 interconnect motor 16 and power source 34 in series. A manually operable by-pass switch 44 connects load 32 and power source 34. A paralleling control 46 is connected to the outputs of generator 12 and power source 34 and the input of switch 42.

Power sensor 38 can be any commercially available unit which is capable of generating a signal representing electric power flow and comparing it with an internally generated reference signal to provide a resultant signal which can be utilized to further control or trim the fuel controller 28, as will hereinafter be more fully described.

Reverse current sensor 40 can be any device which can detect interruption of current flow from the power source 34 and is capable of generating a signal to open switch 42.

Paralleling control 46 can be such as that commercially available from AiResearch, a division of The Garrett Corportion, and designated as model PC 650-60, which is described in the publication HDI 650-60, Optional Equipment, distributed by the above-mentioned AiResearch Division. The paralleling control 46 is connected to the outputs of generator 12 and the power source 36, and serves to generate a signal which closes switch 42 when the frequency of the power output of generator 12 is the same as the frequency of the power supplied by the utility 34 and the power outputs are in phase, thus supplying power from source 34 to the motor 16.

In operation, turbine 14 is started and brought up to normal operating speed by the fuel controller 28, operating in the isochronous mode, which also brings the generator 12, after clutch 20 engages shafts 18 and 22, and the motor 16 through shaft 24, to speed as well. When motor 16 is up to speed, and paralleling control 46 senses that there is no difference between the frequencies and phases of the outputs of generator 12 and the power source 34, a signal is generated which actuates switch 42 to couple the power supply 34 to motor 16 so that it shares the load of driving generator 12. Switch 36 is now actuated to connect generator 12 to load 32.

In normal operation, it is desirable to have motor 16 provide only a small portion of the total driving force to generator 12. The output of motor 16 can be determined from the power flowing through sensor 38, which is a measure of the power flowing from source 34 to the motor 16. The power flow through sensor 38 is compared with a fixed reference signal and the resultant difference signal is utilized to trim fuel controller 28. Thus, under normal fixed load conditions, turbine 14 will be controlled by fuel controller 28 which is constantly trimmed to maintain constant power flow through sensor 38, which results in that motor 16 is always providing a fixed amount of driving force to generator 12. As load 32 changes, motor 16 will respond faster than turbine 14 and will instantaneously provide the increase in power demanded by generator 12 or absorb the decrease in power demanded by generator 12. Sensor 38 will detect the increase or decrease in power flow from source 34 to motor 16 and trim fuel controller 28 which will force turbine 14 to provide all of the power required by generator 12 except for the predetermined amount to be provided by motor 16. It is to be noted that at all times, regardless of transient conditions, motor 16 will hold the output of generator 12 in constant frequency.

In the event power from source 34 is interrupted, reverse current sensor 40 detects this condition and immediately generates a signal which opens switch 42 to disconnect motor 16 from power source 34. Simultaneously, fuel controller 28 returns to simple isochronous operation, since trimming signals are no longer supplied by power sensor 38 which permits turbine 14 to now provide all of the driving power required to drive generator 12 of the system 10. When power from source 34 is again restored, paralleling control circuit 46 generates a signal to switch 42 which closes when the power outputs of generator 12 and source 34 are in frequency and phase. Closure of switch 42 again allows power to flow to motor 16, through power sensor 38 which again generates trimming signals to the fuel controller 28, as hereinbefore described.

In the event of failure of turbine 14, or fuel no longer is available from fuel source 26 for any reason, then turbine 14 will discontinue to operate and overrunning clutch 20 will disengage. Motor 16 will then alone provide all the power required to drive generator 12. When turbine 14 is repaired, or the fuel flow from source 26 is restored, turbine 14 can again be started and brought up to speed, as hereinbefore described. As the turbine 14 builds up to speed it will provide more and more driving force to the generator 12, while the driving force provided by the motor 16 diminishes until normal operations are restored wherein turbine 14 and motor 16 each provide their predetermined share of driving power to generator 12.

In the event the entire system 10 has to be taken off line, transfer of load 32 to power supply 34 can be easily accomplished without interruption of power to the load 32 by opening switch 36 and simultaneously closing by-pass switch 44. There will be no significant wave form distortion of power to load 32 because the output of generator 12 has been in synchronism all along with the output of source 34 in respect to phase and frequency.

While a specific embodiment of the invention has been illustrated and described, it is to be understood that it is provided by way of example only and that the invention is not to be construed as being limited thereto but only by the scope of the following claims. By way of example, differing load proportioning schemes are possible as are multiple fuel sources.

What I claim is:

1. A combination comprising:
   an electric generator;
   first and second mover means connected to simultaneously drive said generator; and
   means connected for proportioning motive energy to said first and second mover means to maintain generator output frequency constant, and responsive to disability of said first mover means to disengage said first mover means and maintain generator output frequency constant with said second mover means, and responsive to disability of said second mover means to disengage said second mover means and maintain generator output frequency constant with said first mover means.

2. The combination of claim 1 wherein said first mover means comprises:
   gas turbine means; and
   fuel controller means for regulating flow of fuel from a fuel source to said gas turbine means in response to electric generator output.

3. The combination of claim 2 further comprising:
   overrunning clutch means interconnecting said gas turbine means and electric generator.

4. The combination of claim 2 wherein said second mover means comprises:
   a synchronous electric motor.

5. The combination of claim 4 wherein said motive energy proportioning means comprises:
   means for connecting said synchronous motor to an electric source in response to generator and electric source outputs; and
   power sensor means for generating a control signal to regulate said fuel controller means in response to energy flow to said synchronous motor.

6. The combination of claim 5 wherein said connecting means comprises:
   paralleling control means for generating a connect signal when the generator and electric source outputs are in phase and frequency; and
   switch means for connecting said synchronous motor to the electric source in response to the connect signal.

7. The combination of claim 6 further comprising:
   reverse current sensor means for generating a disconnect signal to said switch means in response to motor energy flow to disconnect said motor from the electric source.

8. The combination of claim 1 further comprising:
   load switch means for connecting and disconnecting said generator to and from a load.

9. The combination of claim 8 further comprising:
   by-pass switch means for connecting and disconnecting the load to and from the electric source.

10. A combination comprising:
    an electric generator;
    a gas turbine;
    an overrunning clutch interconnecting said turbine and generator;
    a synchronous motor connected to drive said generator;

an isochronous fuel controller for regulating flow of fuel from fuel source to said turbine in response to generator output;

a paralleling controller for generating a connect signal when the generator output and the output of an electric source are in phase and frequency;

a switch for connecting said motor to the electric source in response to the connect signal;

a power sensor for generating a control signal to regulate said fuel controller in response to electric energy flow to said motor;

a reverse current sensor for generating a disconnect signal to said switch in response to motor energy flow to disconnect said motor from the electric source;

a load switch for connecting and disconnecting said generator to and from a load; and a by-pass switch for connecting and disconnecting the load to and from the electric source.

11. A power supply for an electric motor comprising:
an electric generator;

a first drive motor operably connected to provide power for driving said generator;

a second drive motor operably connected to provide power for driving said generator;

means for selectively disconnecting said first drive motor from said generator upon malfunction; and means for selectively disconnecting said second drive motor from said generator upon malfunction.

12. A power supply as in claim 11 including control means for proportioning motive energy between said first and second drive motors to maintain generator output frequency constant.

13. A power supply as in claim 12 wherein said first drive motor comprises an electric motor and said second drive motor is a combustion engine.

14. A power supply as in claim 13 wherein said combustion engine is a gas turbine.

* * * * *